US006629346B2

(12) United States Patent
Tillner

(10) Patent No.: US 6,629,346 B2
(45) Date of Patent: Oct. 7, 2003

(54) METHOD FOR INSTALLING A SEAT COVER AND A SEAT COVER INSTALLATION DEVICE USED FOR PERFORMING THE METHOD

(76) Inventor: Thomas Tillner, Am Amazonenwerk 44, 49205 Hasbergen (DE)

( * ) Notice: Subject to any disclaimer, the term of this patent is extended or adjusted under 35 U.S.C. 154(b) by 0 days.

(21) Appl. No.: 09/905,393

(22) Filed: Jul. 13, 2001

(65) Prior Publication Data

US 2002/0108222 A1 Aug. 15, 2002

(51) Int. Cl.[7] .......................... B68G 7/00; B25B 27/14; B23P 21/00

(52) U.S. Cl. ............................. 29/91; 29/91.1; 29/714; 29/281.5

(58) Field of Search ........................ 29/91, 91.1, 281.1, 29/714, 451, 281.5, 565

(56) References Cited

U.S. PATENT DOCUMENTS 5,134,763 A * 8/1992 Schulz, Jr. et al. ............. 29/91

FOREIGN PATENT DOCUMENTS

EP 403815 1/1994

* cited by examiner

*Primary Examiner*—John C. Hong
(74) *Attorney, Agent, or Firm*—Milde & Hoffberg, LLP

(57) ABSTRACT

An automated method for installing a seat cover and a device for implementing the method are disclosed. The seat cover is provided with at least one shaped spar onto a seat body that includes at least one securing element which is positioned in the base of at least one slot in the seat body and into which the shaped spar may be secured. The method includes the following steps:

(a) positioning the seat cover onto the seat body and inserting the shaped spar into the slot of the seat body;

(b) penetrating the seat body with a gripper jaw assembly of a shaped spar gripper from the seat body underside into the slot;

(c) opening the gripper jaw assembly, gripping the shaped spar, and closing the gripper jaw assembly;

(d) applying tension by means of the gripper jaw assembly gripping the shaped spar toward the underside of the seat body until the shaped spar clicks or is secured in place in the securing element; and (e) opening the gripper jaw assembly of the shaped spar gripper and removing the shaped spar gripper from the seat body.

6 Claims, 5 Drawing Sheets

METHOD FOR INSTALLING A SEAT COVER AND A SEAT COVER INSTALLATION DEVICE USED FOR PERFORMING THE METHOD

BACKGROUND OF THE INVENTION

The invention relates to a method for installing a seat cover, including at least one shaped spar, onto a seat body that includes at least one securing element whose base is positioned over at least one slot in the seat body into which the shaped spar may be secured.

A shaped spar that is combined with a covering material is known from the European Patent EP 403 815 B1. There are slots in the seat body into which recessed securing elements are arranged. The seat cover is connected to the seat body so that the shaped spar is pressed into the securing elements from above. In this manner, simple installation of the seat cover onto a seat body that consists, for example, of foam, is possible. It has been shown however, that pressing the shaped spar into the securing elements is difficult because of the elasticity of the seat cover. An automated installation of the seat cover onto the seat body is additionally made more difficult because the shaped spar is secured to the underside of the seat cover and therefore cannot be gripped by robot grippers or the like. When pressed from above, the seat cover material becomes a hindrance so that machine gripping without damaging the material is not possible. Even manual installation has the difficulty that the position of the shaped spar and the securing element located below it must be detected by "feel".

SUMMARY OF THE INVENTION

It is therefore a principal object of the present invention to provide a method for installing a seat cover provided with at least one shaped spar that allows automated seat cover installation.

This object, as well as other objects which will become apparent from the discussion that follows, are achieved, according to the present invention, by providing a method which includes at least the following steps:

(a) penetrating the seat body with a gripper jaw of a shaped spar gripper from the seat body underside into the slot;

(b) opening the gripper jaw assembly, gripping the shaped spar, and closing the gripper jaw assembly;

(c) applying tension by means of the gripper jaw assembly gripping the shaped spar toward the underside of the seat body until the shaped spar clicks or is secured in place in the securing element; and (d) opening the gripper jaws of the shaped spar gripper and removing the shaped spar gripper from the seat body.

This method is a reversal of the customary installation procedure. While the shaped spar is pressed into the securing element from the upper side of the seat cover in accordance with the state of the art, the method according to the invention uses the opposite approach, namely pressing the seat body from below, gripping the shaped spar, and then pressing it into the securing element until it clicks or snaps into place.

The seat body is advantageously positioned on top of a seat body bracket. Particularly for seat bodies made of soft foam, the forces necessary to create the snap connection between the shaped spar and the securing element are distributed over a greater area so that the deformation of the seat body during installation is reduced, resulting in reduced return forces within the seat body.

Penetration of the seat body may be performed by a cutting tool in soft foam and similar materials that is preferably positioned on the tip of the shaped spar gripper. A single cut can allow the insertion of the shaped spar gripper.

It is especially advantageous if at least one access channel is included in the slot that extends from the base of the slot to the underside of the seat body and through which the shaped spar gripper may be passed. This access channel may be included in the seat body as a first step, for which techniques such as drilling or grinding, or melting and cutting in the case of thermo-plastic foam materials, are particularly suited.

A seat body can also be used in which at least one access channel is included at the time of manufacture that extends from the base of the slot to the underside of the seat body, and through which the shaped spar gripper may be fed.

At least one access channel should be positioned between each pair of securing elements in order to distribute the forces evenly to the shaped spars and securing elements, and thus to ensure that the shaped spar clicks into place in all the securing elements on the seat body.

The invention further relates to a seat cover installation device used to perform the method described above. Since the installation of seat covers has always been performed manually, it is a further object of the invention to provide an installation device by means of which the method according to the invention may be performed automatically in order to secure a seat cover to a seat body.

This object is achieved by a seat cover installation device with a seat body bracket and at least one shaped spar gripper which may be dislocated by a first actuation device with respect to the seat body bracket, and which includes a gripper jaw assembly with at least two gripper jaws that may be opened or closed by means of a second actuation device.

Gripper jaws and shaped spar grippers may be operated independently of each other using drive mechanisms such as pneumatic cylinders or stepper motors. It is therefore possible to reach through the seat body from beneath, grip the shaped spar hanging down from the positioned seat cover, and insert it into the securing elements. Since the shaped spar is freely accessible from below in the slot, it may be gripped positively, centered, and secured using force.

The object is also achieved by a seat cover installation device with at least one fixed, positioned shaped spar gripper and a seat body bracket that may dislocated with respect to the shaped spar gripper via a first actuation device, whereby the shaped spar gripper includes a gripper jaw assembly with at least two gripper jaws that may be opened or closed by means of a second actuation device.

For this, the entire seat body bracket is moveable with respect to the fixed, vertically-positioned shaped spar grippers. The weight of the seat body bracket is sufficient to overcome friction forces in the support and to cause a sinking so that the first actuation device needs only to operate in one direction. Thus, for example, simpler pneumatic cylinders with no double chamber may be used as an actuation device.

This device allows penetration of the seat body by the gripper device and automatic gripping of the shaped spar without requiring additional positioning. Based on the jaw-type formation, a broad aperture is provided in an open gripper jaw assembly so that it may grip, center, and surround a shaped spar not positioned precisely above the securing elements with no extra action required by the operator.

A shaped spar gripper with the following properties is particularly advantageous:

(a) The shaped spar gripper includes a guide tube into which a tension rod coupled with the gripper jaws is inserted, and which may be at least partially drawn into the gripper jaws; and (b) The gripper jaws are connected via their supporting shanks using a coupling whereby the tension rod is connected to at least one of the supporting shanks and/or the coupling.

The tube-shaped formation with gripper jaws that may be integrated within the guide tube permits a compact design, and consequently requires only a small width of the access channel incorporated into the seat body.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
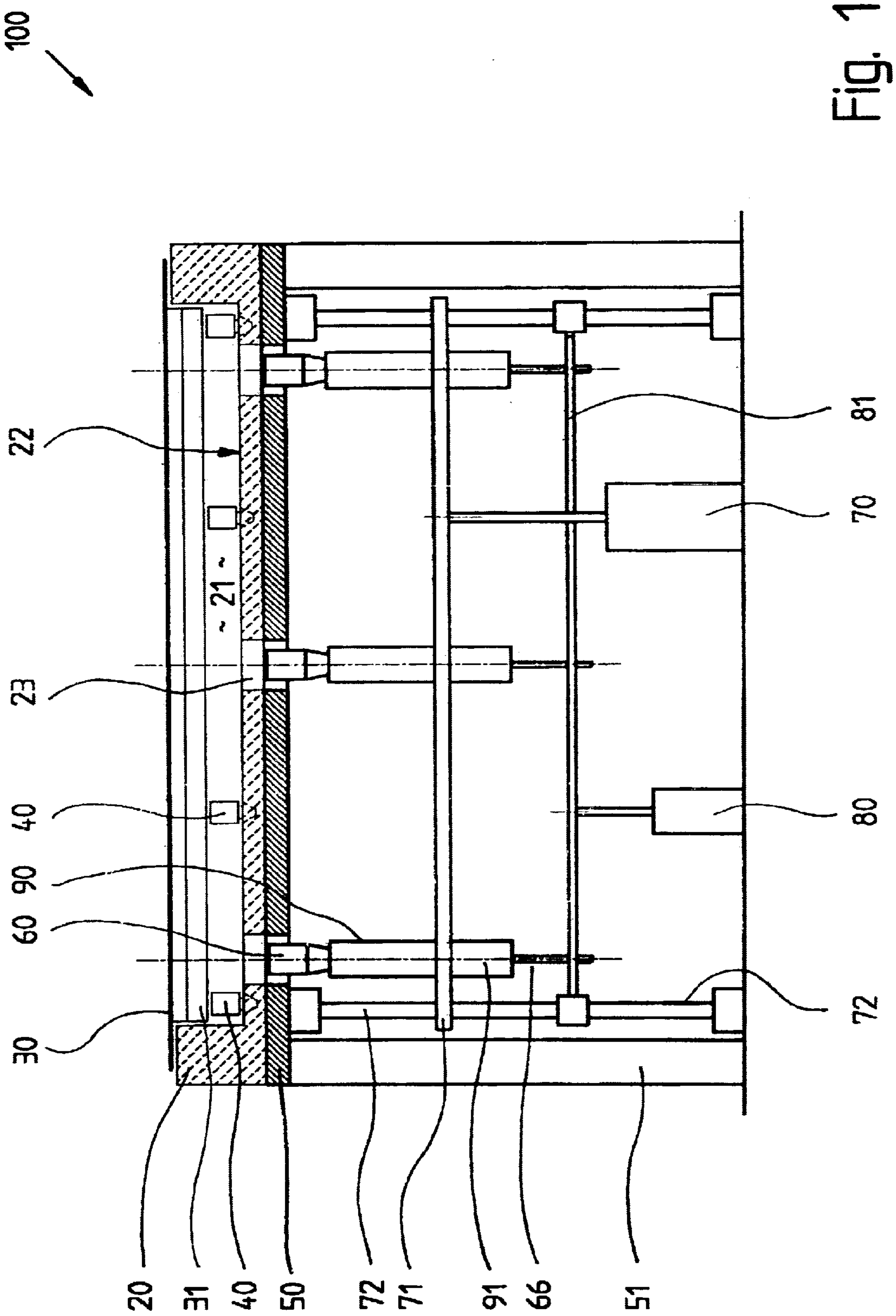
FIG. 1 is a schematic, cutaway view of a seat cover installation device according to the invention.

The preferred embodiments of the present invention will now be described with reference to FIGS. 1–4 of the drawings. Identical elements in the various figures are designated with the same reference numerals.

FIG. 1 shows a seat cover installation device 100 based on the invention. A seat body bracket 50 is supported on a table-type frame. A seat body 20 is positioned on it in which a slot 21 has been included. In the base 22 of slot 21 are a large number of securing elements 40 are fastened. An access channel 23 is between each pair of securing elements 40. A seat cover 30 is positioned on top of a seat body 20, whereby the sewn-in shaped spar hangs down so that it is above the securing elements 40. Several shaped spar grippers 90 are positioned within recesses in the seat body bracket 50 so that they are free to move.

The shaped spar gripper 90 may be raised and lowered above the level of the seat body bracket 50 via a connection plate 71 that is supported and free to move in guides 72. A first actuator mechanism 70 is provided for this that may be in the form of, for example, a pneumatic cylinder.

A tension rod 66 is inserted into a guide tube 91 of the shaped spar gripper 90 by means of which a gripper jaw assembly 60 can be raised and lowered relative to the guide tube 91. Each of the tension rods 66 in the gripper jaws is connected together via a connection plate 81 that is supported and free to move in guide 72. Simultaneous raising or lowering of all tension rods 66 is possible via a second actuator mechanism 80 that is preferably in the form of a pneumatic cylinder.

It is also possible to move each shaped spar gripper 90 and each gripper jaw assembly 60 via separate actuators such as double-acting pneumatic cylinders in order to achieve simple adaptation of the seat cover mounting device 100 based on the invention to varying shapes of the seat body 20.

With the seat cover mounting device 100 shown in FIG. 1, it is possible both to raise and lower the entire shaped spar gripper 90 including the gripper jaw assembly 60 and to cause a relative movement between the tension rod 66 and the guide tube 91 that results in an opening or closing of the gripper jaw assembly 60.

Figure 3A:
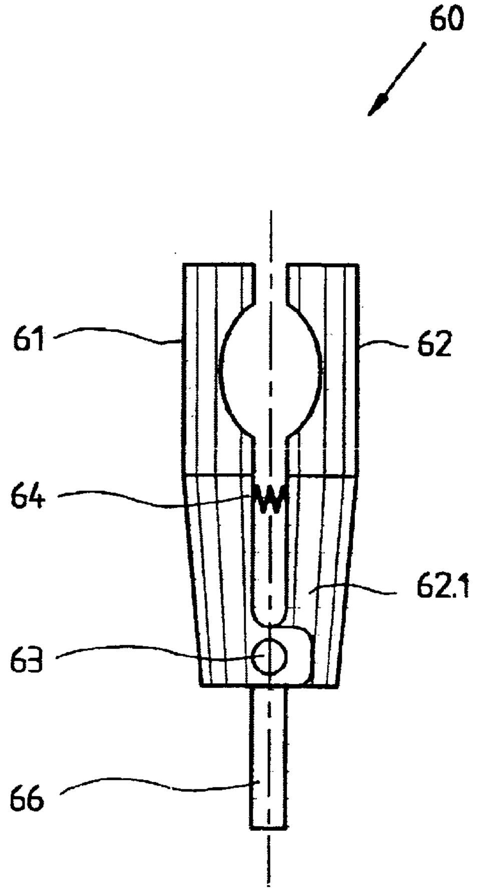
FIGS. 3*a* and 3*b* are side and front views, respectively, of one preferred embodiment of a gripper jaw assembly according to the invention.

As FIG. 3*a* shows, the gripper jaw assembly 60 is particularly formed by two gripper jaws 61, 62 that are connected together via a coupling 63. The tension rod 66 preferably grips directly on the coupling 63. A pressure spring 64 is positioned between the gripper jaws 61, 62 that causes an opening of the gripper assembly jaws.

Figure 3B:
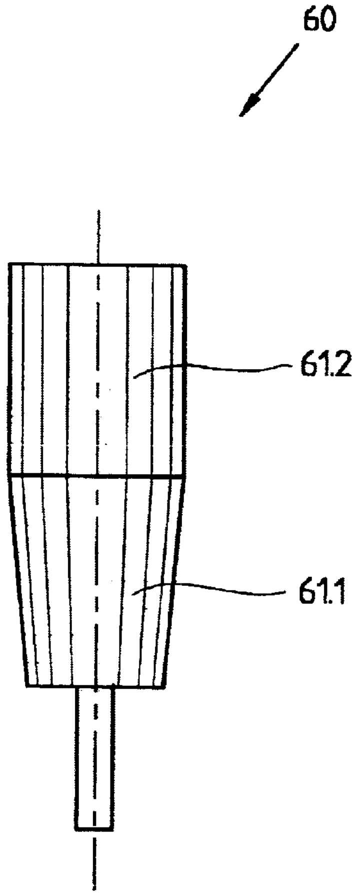

FIG. 3*b* shows how a support shank 61.1 of the gripper jaw 61 is shaped as a truncated sphere. An upper part 61.2 is formed as a section of a cylinder. Via the spherical support shanks 61.1, 62.1, the gripper jaw assembly 60 is centered above its support shanks 61.2, 62.2 as it is drawn into the guide tube 91, resulting in a closing of the gripper assembly jaws 61, 62 against the spring pressure of the spring 64. The spring 64 is thus pre-tensioned, so that when the gripper jaw assembly 60 is withdrawn from the guide tube 91, the jaws 61, 62 are automatically spread apart.

Figure 4A:
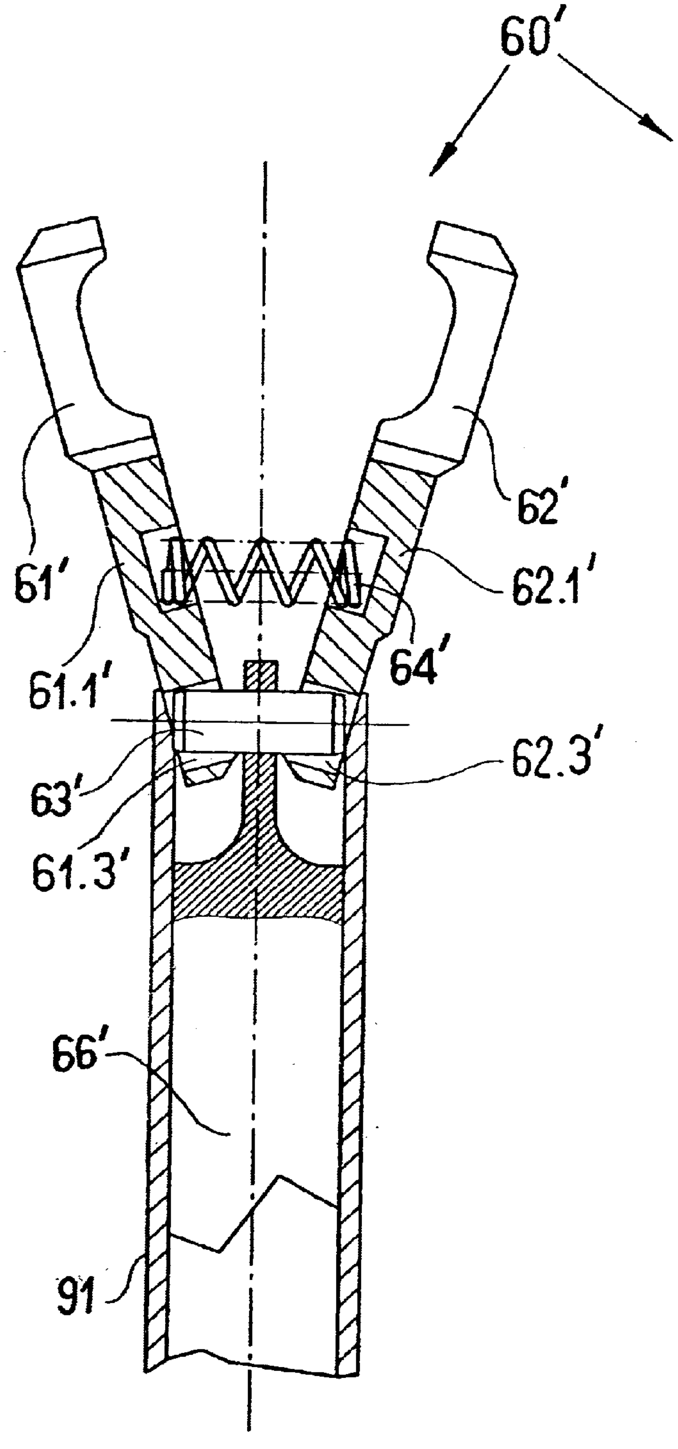
FIGS. 4*a* and 4*b* are side views of another preferred embodiment of a shaped spar gripper in various positions.
Figure 4B:
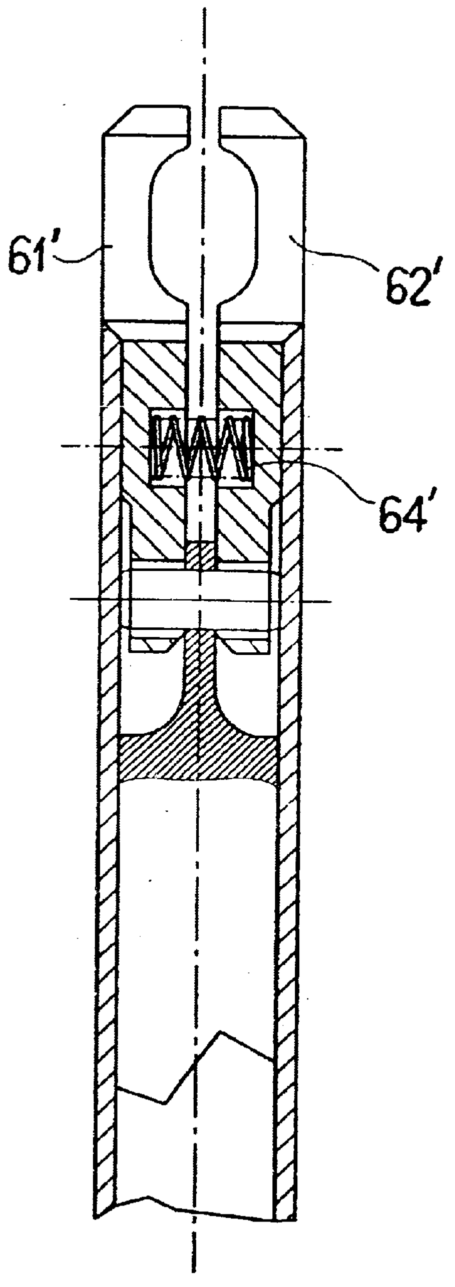

FIGS. 4*a* and 4*b* show another embodiment. For it, each lower portion 61.1', 62.1' of the gripper jaw assembly 60' is formed of several sections of a cylinder that join together at a bevel. The coupling 63' is rotated by 90° with respect to the embodiment shown in FIG. 3. The support shanks 61.1'. 62.1' include drilled holes 61.3', 62.3' whose diameters are greater than the diameters of a coupling pin 63' so that is does not hinder the spreading of the gripper jaws 61', 62'. The gripper jaws 61', 62' thus supported are free to move through two dimensions, namely together and sideways around the shank 63' so that a proper alignment of the gripper assembly 60' is possible while it is gripping the shaped spar 31.

The tension rod 66' includes an outer diameter that approximately corresponds to the inner diameter of the guide tube 91', whereby a certain play is provided between the guide tube 91' and the tension rod 66' in order to enable free movement of the tension rod 66' within the guide tube 91'. When a tensile force acts on the tension rod 66' while at the same time guide tube 91' is fixed, the cylinder sections 61.1', 62.1' cause the gripper jaws 61', 62' to be centered within the guide tube 91' and to be pressed together by the pre-tension of the spring 64' until they are arranged in the position within the guide tube 91' shown in FIG. 4*b*.

The operating method of the invention is described in more detail using FIGS. 2*a* through 2*f*.

Figures 2A, 2B, 2C:
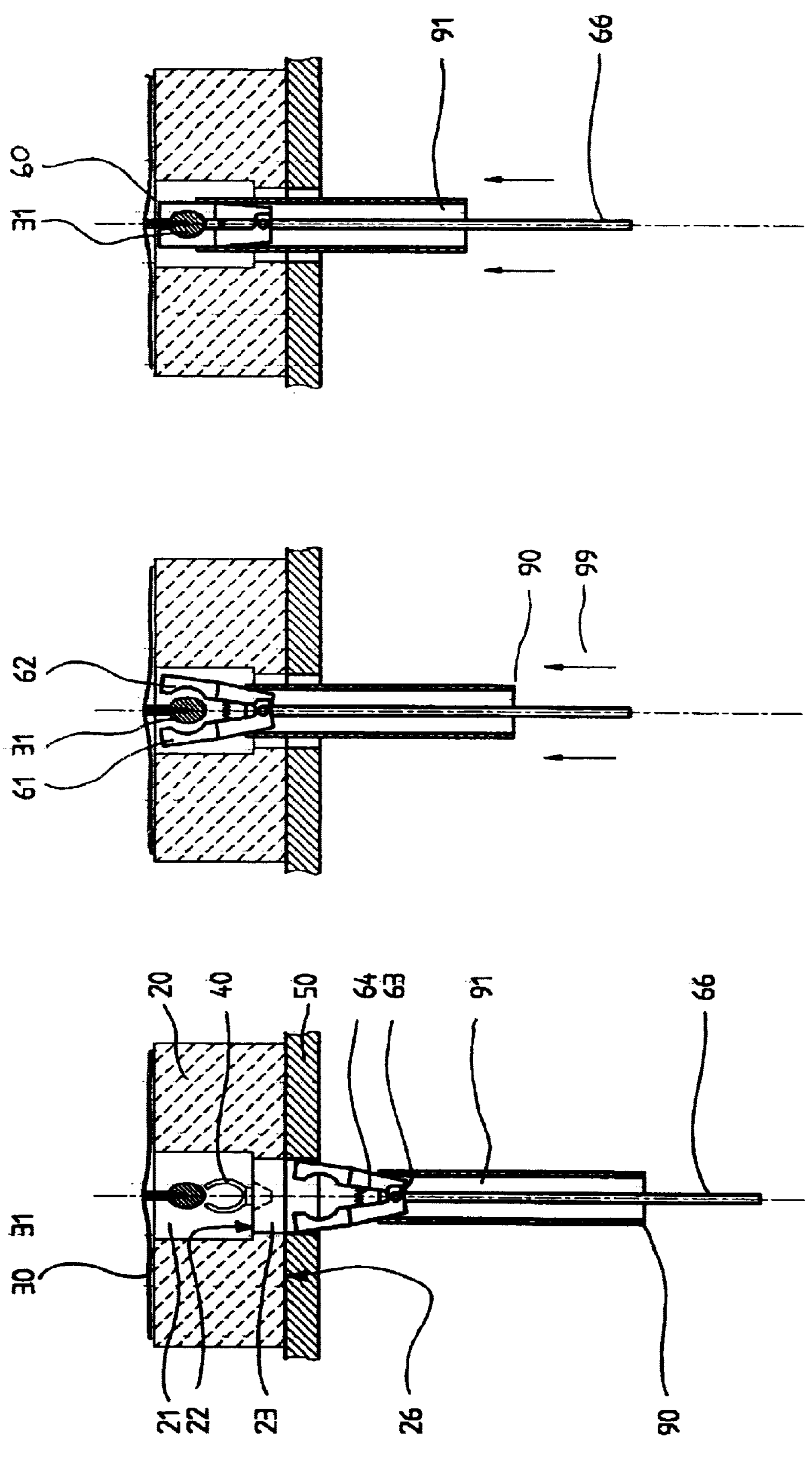
FIGS. 2*a*–2*f* are cutaway views of the installation of a seat cover in accordance with the invention in various method steps.

In the initial position shown in FIG. 2*a*, a seat body 20 is positioned on a seat body bracket 50. Within a slot 21 in the seat body 20, securing elements 40 are arranged that are anchored to the base 22 of slot 21. Access channels 23 are incorporated into the seat body 20 that extend from the base 22 of slot 21 to the seat body underside 26. The shaped spar gripper 90 with gripper jaw assembly 60 is arranged below the seat body 20. In order to keep the size of the access channel 23 within the seat body 20 small, it is advantageous for the shaped spar gripper 90 with a closed gripper jaw assembly 60 to be moved through the access channel 23 and the gripper jaw assembly 60 to be opened when it is first into slot 22 of seat body 20.

By applying a force along the direction shown by the arrow 99 in FIG. 2*b*, the shaped spar gripper 90 is displaced until the shaped spar 31 lies between the opened gripper jaws 61, 62.

Lifting the guide tube 91 and simultaneously blocking the tension rod 66 draw the gripper jaw assembly 60 into the guide tube 91, whereby the gripper jaw assembly 60 closes and the shaped spar 31 is gripped, as FIG. 2*c* shows.

Figure 2D:
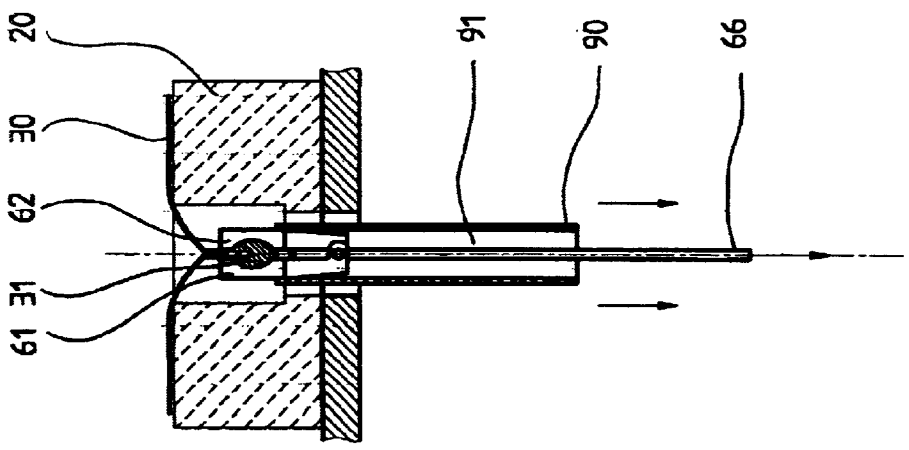

Finally, as FIG. 2*d* shows, the entire shaped spar gripper 90 is pulled downward. At the same time, the guide tube 91 and the tension rod 66 are also pulled downward. The shaped spar 31 gripped within the gripper jaw assembly 60 is drawn into the securing elements 40. Securing of the shaped spar 31 within the securing elements 40 is possible using shaped, springed rastering elements or via a friction clamp connection. The seat cover 30 that has the shaped spar 31 sewn or otherwise attached to it is simultaneously pulled into the slot 21 of the seat body 20 as the shaped spar 31 is pulled into the securing elements 40, so that the material of the seat cover 30 is tightly drawn over the seat body 20.

Figure 2E:
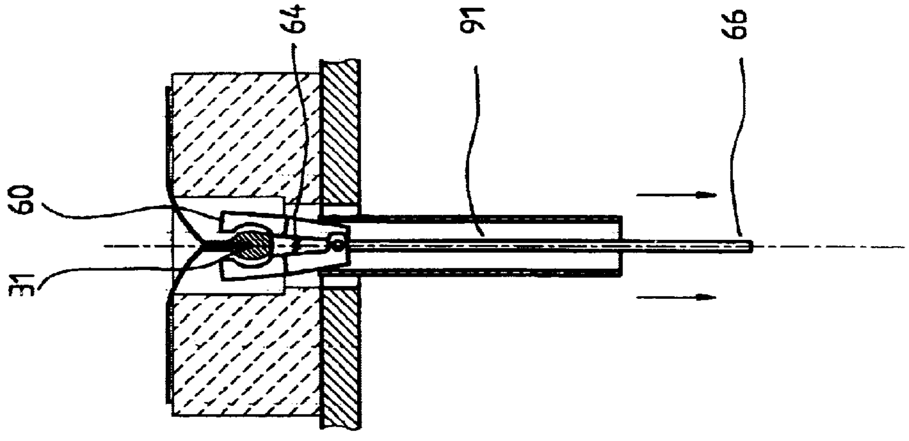

From this position, as FIG. 2*e* shows, the guide tube 91 is forced downward, whereby the fixed tension rod 66 causes the gripper head 60 to extend partially from the guide tube and to allow the gripper assembly jaws 61, 62 to spread because of the force of the spring 64. This releases the shaped spar 31 that was previously gripped.

Figure 2F:
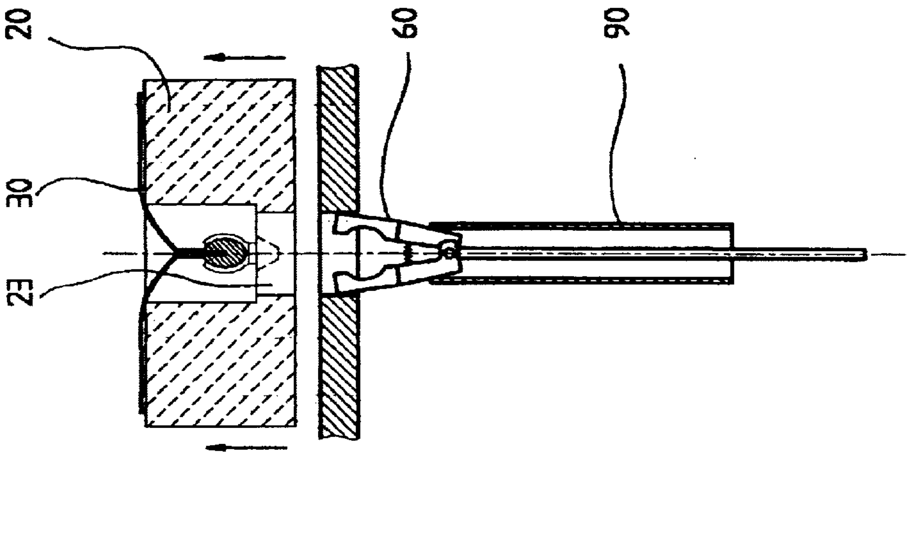

A relative movement between the gripper jaw assembly 60 and the guide tube 91 from which the gripper jaw assembly 60 partially extends out of guide tube 91 leads to the opening of the gripper jaw assembly 60. A relative movement drawing the gripper jaw assembly 60 into the guide tube 91 causes it to close. Therefore, these functions may be activated during all stages of the procedure in that the tension rod 66 is moved within the fixed guide tube 91, or in that the guide tube 91 is moved while the tension rod 66 remains fixed. Also, both elements can move opposite to each other. FIG. 2*f* shows that the entire shaped spar gripper 90 including the gripper head 60 is moved downward out of the seat body 20 through the access channel, and the seat body 20 can be removed from the seat body bracket 50 together with the installed seat cover 30. After another seat body is positioned, the initial position shown in FIG. 2*a* is again achieved. The procedure can begin again from the beginning after closing of the gripper head 30.

There has thus been shown and described a novel method for installing a seat cover and a seat cover installation device used for performing the method which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A seat cover installation device for performing a method of installing a seat cover provided with at least one shaped spar onto a seat body that includes at least one securing element which is positioned in the base of at least one slot in the seat body and into which the shaped spar may be secured, said method comprising steps of:

(a) positioning the seat cover onto the seat body and inserting the shaped spar into the slot of the seat body;

(b) penetrating the seat body with a gripper jaw assembly of a shaped spar gripper from the seat body underside into the slot;

(c) opening the gripper jaw assembly, gripping the shaped spar, and closing the gripper jaw assembly;

(d) applying tension by means of the gripper jaw assembly gripping the shaped spar toward the underside of the seat body until the shaped spar clicks or is secured in place in the securing element; and opening the gripper jaw assembly of the shaped spar gripper and removing the shaped spar gripper from the seat body;

said installation device comprising a seat body bracket and at least one shaped spar gripper that may be displaced with respect to the seat body bracket using a first actuator device and which includes a gripper jaw assembly with at least two gripper jaws that may be opened or closed via a second actuator device, the shaped spar gripper having a guide tube in which a tension rod is coupled with the gripper jaws, and into which the gripper jaws may be at least partially drawn.

2. A seat cover installation device according to claim 1, wherein the gripper jaws are coupled together by their support shanks via a coupling and wherein the tension rod is connected with at least one of the support shanks and the coupling.

3. A seat cover installation device according to claim 2, wherein the support shanks have the shape of a radial section of a cone.

4. A seat cover installation device according to claim 2, wherein the support shanks are of radial sections of at least two cylinders with different diameters, whereby the larger cylinder includes a bevel at the transition area.

5. A seat cover installation device for performing a method of installing a seat cover provided with at least one shaped spar onto a seat body that includes at least one securing element which is positioned in the base of at least one slot in the seat body and into which the shaped spar may be secured, said method comprising steps of:

(a) positioning the seat cover onto the seat body and inserting the shaped spar into the slot of the seat body;

(b) penetrating the seat body with a gripper jaw assembly of a shaped spar gripper from the seat body underside into the slot;

(c) opening the gripper jaw assembly, gripping the shaped spar, and closing the gripper jaw assembly;

(d) applying tension by means of the gripper jaw assembly gripping the shaped spar toward the underside of the seat body until the shaped spar clicks or is secured in place in the securing element; and (e) opening the gripper jaw assembly of the shaped spar gripper and removing the shaped spar gripper from the seat body;

said installation device comprising at least one fixed shaped spar gripper and a seat body bracket that may be displaced with respect to the shaped spar gripper via a first actuator device, wherein the shaped spar gripper includes a gripper jaw assembly with at least two gripper jaws that may be opened or closed via a second actuator device, the shaped spar gripper having a guide tube in which a tension rod is coupled with the gripper jaws, and into which the gripper jaws may be at least partially drawn.

6. A seat cover installation device according to claim 5, wherein the gripper jaws are coupled together by their support shanks via a coupling and wherein the tension rod is connected with at least one of the support shanks and the coupling.

* * * * *